(12) United States Patent
Kim et al.

(10) Patent No.: US 9,402,259 B2
(45) Date of Patent: Jul. 26, 2016

(54) DEVICE AND METHOD FOR TRANSMITTING AND RECEIVING CONTROL INFORMATION IN A WIRELESS COMMUNICATION SYSTEM SIMULTANEOUSLY SUPPORTING A PLURALITY OF WIRELESS COMMUNICATION METHODS

(75) Inventors: Dongcheol Kim, Anyang-si (KR); Hangyu Cho, Anyang-si (KR); Wookbong Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 136 days.

(21) Appl. No.: 13/809,869

(22) PCT Filed: Jul. 12, 2011

(86) PCT No.: PCT/KR2011/005108
§ 371 (c)(1),
(2), (4) Date: Jan. 11, 2013

(87) PCT Pub. No.: WO2012/008737
PCT Pub. Date: Jan. 19, 2012

(65) Prior Publication Data
US 2013/0114557 A1 May 9, 2013

Related U.S. Application Data

(60) Provisional application No. 61/363,289, filed on Jul. 12, 2010.

(51) Int. Cl.
*H04W 88/06* (2009.01)
*H04W 88/10* (2009.01)
(Continued)

(52) U.S. Cl.
CPC ......... *H04W 72/0473* (2013.01); *H04L 5/0053* (2013.01); *H04W 52/146* (2013.01);
(Continued)

(58) Field of Classification Search
CPC ... H04W 72/04; H04L 1/1887; H04L 5/0032; H04L 5/0053; H04L 5/0055; H04L 5/0073
See application file for complete search history.

(56) References Cited

U.S. PATENT DOCUMENTS

2010/0274899 A1* 10/2010 Shrivastava et al. .......... 709/226
2011/0032873 A1* 2/2011 Kim et al. ..................... 370/328
(Continued)

FOREIGN PATENT DOCUMENTS

KR 1020080082943 9/2008
KR 1020080102026 11/2008
KR 1020100019946 2/2010

OTHER PUBLICATIONS

Lee et al.; "Text changes to the S-SFH-IE in IEEE P802.16m/D2 (15.3.6.5.1.2);" Samsung Electronics Co. Ltd.;(Nov. 17, 2009).*
(Continued)

*Primary Examiner* — Alpus H Hsu
*Assistant Examiner* — Elton Williams
(74) *Attorney, Agent, or Firm* — Lee, Hong, Degerman, Kang & Waimey; Jonathan Kang; Michael Monaco (57) ABSTRACT

A method and device for determining a number of fast feedback channel (FFBCH) in a wireless communication system supporting a first and second wireless communication scheme. The method includes determining the number of FFBCH ($N_{FFB}$) in an uplink subframe by using the following equation: $N_{FFB}=N_{fb} \times N_{FB}-k \times N_{HFB}/6$. Here, $N_{fb}=3$ or 4, $N_{FB}$ is a number of distributed logical resource units in the uplink subframe reserved for feedback channels, k is a value determined according to a ratio of a number of downlink subframes to a number of uplink subframes in a frame, and $N_{HFB}$ is a value defined in a secondary superframe header subpacket 1 information element.

7 Claims, 4 Drawing Sheets

(51) Int. Cl.
  *H04W 52/58* (2009.01)
  *H04W 72/04* (2009.01)
  *H04L 5/00* (2006.01)
  *H04W 52/14* (2009.01)
  *H04W 52/16* (2009.01)
  *H04W 72/12* (2009.01)

(52) U.S. Cl.
  CPC .............. *H04W52/16* (2013.01); *H04W 52/58* (2013.01); *H04W 72/1215* (2013.01); *H04W 88/06* (2013.01); *H04W 88/10* (2013.01)

(56) References Cited

U.S. PATENT DOCUMENTS

2011/0199945 A1* 8/2011 Chang et al. ............. 370/281
2011/0216843 A1* 9/2011 Hsuan et al. ............. 375/260

OTHER PUBLICATIONS

Chen et al. Text Proposal of PC-A-MAP IE Assignment in IEEE802.16 D4 (16.3.6); Feb. 22, 2010.*

IEEE, "Overview of IEEE P802.16m Technology and Candidate RIT for IMT-Advanced", IEEE 802.16 IMT-Advanced Evaluation Group Coordination Meeting, Jan. 2010, 87 pages, (relevant portion: abstract and pp. 42-45).

PCT International Application No. PCT/KR2011/005108, Written Opinion of the International Searching Authority dated Feb. 17, 2012, 17 pages.

* cited by examiner

DEVICE AND METHOD FOR TRANSMITTING AND RECEIVING CONTROL INFORMATION IN A WIRELESS COMMUNICATION SYSTEM SIMULTANEOUSLY SUPPORTING A PLURALITY OF WIRELESS COMMUNICATION METHODS

CROSS-REFERENCE TO RELATED APPLICATIONS

This application is the National Stage filing under 35 U.S.C. 371 of International Application No. PCT/KR2011/005108, filed on Jul. 12, 2011, which claims the benefit of U.S. Provisional Application Ser. No. 61/363,289, filed on Jul. 12, 2010, the contents of which are all hereby incorporated by reference herein in their entirety.

TECHNICAL FIELD

The following description relates to wireless communication, and more specifically, to a device and method for transmitting/receiving control information in a wireless communication system simultaneously supporting a first wireless communication method and a second wireless communication method.

BACKGROUND ART

In IEEE 802.16m, one wireless communication system, a base station (BS) can transmit, to a mobile station (MS), necessary system parameters and system configuration information on a superframe header (SFH) corresponding to a downlink control channel. The SFH includes system information necessary for the MS to perform initial network entry, network reentry or handover. The SFH is divided into a primary SFH (P-SFH) and a secondary SFH (S-SFH). The P-SFH will be described first. A BS transmits a P-SFH to an MS for each superframe. In addition, the BS can transmit an S-SFH to the MS for each superframe. An SFH may be called a broadcast channel (BCH) (which includes a primary BCH (P-BCH) and a secondary BCH (S-BCH).

An advanced MAP (A-MAP) corresponding to a downlink control channel includes unicast service control information, and thus the A-MAP is also called unicast control information. A unicast service A-MAP is classified into a user-specific A-MAP and a non-user-specific A-MAP. The user specific A-MAP is divided into an assignment A-MAP, a HARQ feedback A-MAP and a power control A-MAP.

DISCLOSURE

Technical Problem

An object of the present invention is to provide a method for transmitting control information by a base station in a wireless communication system supporting a first wireless communication method and a second wireless communication method.

Another object of the present invention is to provide a method for receiving control information at a mobile station in a wireless communication system supporting a first wireless communication method and a second wireless communication method.

Another object of the present invention is to provide a BS device for transmitting control information in a wireless communication system supporting a first wireless communication method and a second wireless communication method.

Another object of the present invention is to provide an MS device for receiving control information in a wireless communication system supporting a first wireless communication method and a second wireless communication method.

The technical problems solved by the present invention are not limited to the above technical problems and those skilled in the art may understand other technical problems from the following description.

Technical Solution

According to one aspect of the present invention, a method for transmitting, by a base station, control information in a wireless communication system supporting a first wireless communication scheme and a second wireless communication scheme includes: transmitting, to a mobile station, second control information including information on a resource size of first control information for an uplink power control, wherein the resource size of the first control information is calculated through a ceil function rounding up to a whole number using a number of available uplink subframe, a number of available downlink subframe per a frame and a number of fast feedback channel (FFBCH). The first control information may correspond to a power control A-MAP (PC A-MAP) and the second control information may correspond to a secondary superframe header sub-packet 1 information element (S-SFH SP1 IE) message. The resource size of the first control information may be represented by 2×ceil(10×the number of uplink subframe/the number of downlink subframe), 2×ceil (19×the number of uplink subframe/the number of downlink subframe) or 2×ceil(32×the number of uplink subframe/the number of downlink subframe). The second control information may indicate the resource size of the first control information as 0 when the first control information is not used. Regions for the first wireless communication scheme and the second communication scheme are configured by frequency division multiplexing (FDM) scheme.

According to another aspect of the present invention, a method for receiving, at a mobile station, control information in a wireless communication system supporting a first wireless communication scheme and a second wireless communication scheme includes: receiving, from a base station, second control information including information on a resource size of first control information for an uplink power control, wherein the resource size of the first control information is calculated through a ceil function rounding up to a whole number using a number of available uplink subframe, a number of available downlink subframe per a frame and a number of fast feedback channels (FFBCHs). The method may further include detecting, a position of third control information transmitted in the same message in which the first control information is transmitted, based on the resource size of the first control information. The first control information may corresponds to a PC A-MAP, the second control information may correspond to an S-SFH SP1 IE, and the third control information may be allocated to a frequency region adjacent to the first control information in the message. The first control information may be a PC A-MAP, the third control information may be a non-user-specific A-MAP, and the message may be an A-MAP.

The resource size of the first control information may be represented by 2×ceil(10×the number of uplink subframe/the number of downlink subframe), 2×ceil(19×the number of uplink subframe/the number of downlink subframe) or 2×ceil (32×the number of uplink subframe/the number of downlink subframe). The second control information may indicate the resource size of the first control information is 0 when the first control information is not used.

According to another aspect of the present invention, a base station device transmitting control information in a wireless communication system supporting a first wireless communication scheme and a second wireless communication scheme includes: a transmitter transmitting, to a mobile station, second control information including information on a resource size of first control information for an uplink power control, wherein the resource size of the first control information is calculated through a ceil function rounding up to a whole number using a number of available uplink subframe, a number of available downlink subframe per a frame and a number of fast feedback channel (FFBCH).

According to another aspect of the present invention, a mobile station device receiving control information in a wireless communication system supporting a first wireless communication scheme and a second wireless communication scheme includes a receiver receiving, from a base station, second control information including information on a resource size of first control information for an uplink power control, wherein the resource size of the first control information is calculated through a ceil function rounding up to a whole number using a number of available uplink subframe, a number of available downlink subframes per a frame and a number of fast feedback channel (FFBCH).

The mobile station device may further include a processor detecting, a position of third control information transmitted in the same message in which the first control information is transmitted, based on the resource size of the first control information.

Advantageous Effects

According to embodiments of the present invention, in a wireless communication system simultaneously supporting a first wireless communication method and a second wireless communication method, a BS efficiently transmits information on a PC A-MAP size, and thus downlink control overhead of the BS can be reduced.

Furthermore, since the BS transmits information on a PC A-MAP size for both an MS using IEEE 802.16m system and the legacy MS, both the IEEE 802.16m MS and the legacy MS know the PC A-MAP size, and thus even a non-user-specific A-MAP can be efficiently detected, improving communication performance.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a mobile communication system conforming to Institute of Electrical and Electronics Engineers (IEEE) 802.16 and 3GPP (3rd Generation Partnership Project) is used. However, the description is applicable to any other mobile communication system except for specific features inherent to IEEE 802.16 and 3GPP.

In some instances, known structures and devices are omitted or are shown in block diagram form, focusing on important features of the structures and devices, so as not to obscure the concept of the invention. The same reference numbers will be used throughout this specification to refer to the same or like parts.

In the following description, the term terminal generically refers to a mobile or fixed user terminal device such as a User Equipment (UE), a Mobile Station (MS), an Advanced Mobile Station (AMS), a machine to machine (M2M) device, etc. In addition, the term Base Station (BS) generically refers to any node at a network end which communicates with a UE, such as a Node B, an evolved Node B (eNode B), an Access Point (AP), etc.

In a mobile communication system, an MS can receive information from a BS on downlink and transmit data to the BS on uplink. Information transmitted from or received at the MS includes data and various types of control information. There are many physical channels depending on the types and usages of information transmitted from or received at MSs.

Figure 1:
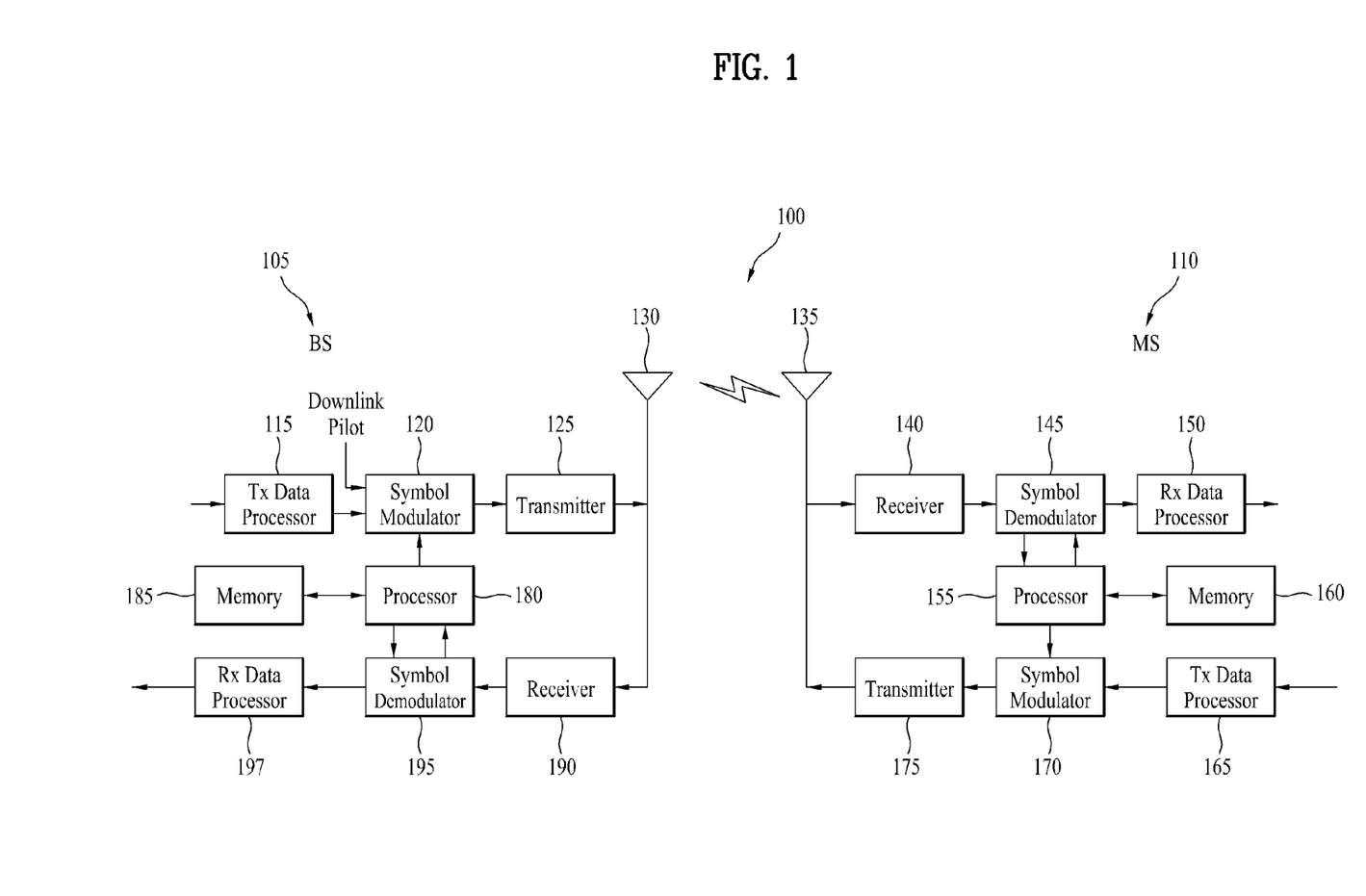
FIG. 1 is a block diagram showing configurations of a BS 105 and an MS 110 in a wireless communication system 100.

FIG. 1 is a block diagram showing configurations of a BS 105 and an MS 110 in a wireless communication system 100.

While one BS 105 and one MS 110 are shown in order to simplify illustration of the wireless communication system 100, the wireless communication system 100 can include one or more BSs and/or one or more MSs.

Referring to FIG. 1, the BS 105 may include a transmission (Tx) data processor 115, a symbol modulator 120, a transmitter 125, a transmit/receive antenna 130, a processor 180, a memory 185, a receiver 190, a symbol demodulator 195, and a reception (Rx) data processor 197. The MS 110 may include a Tx data processor 165, a symbol modulator 170, a transmitter 175, a transmit/receive antenna 135, a processor 155, a memory 160, a receiver 140, a symbol demodulator 145, and an Rx data processor 150. While FIG. 1 shows that the BS 105 and the MS 110 respectively include the transmit/receive antennas 130 and 135, the BS 105 and the MS 110 may include a plurality of transmit/receive antennas. Accordingly, the BS 105 and the MS 110 according to the present invention support a MIMO (Multiple Input Multiple Output) system.

The BS 105 according to the present invention can support both SU-MIMO (Single User-MIMO) and MU-MIMO (Multi-User-MIMO).

On downlink, the Tx data processor 115 receives traffic data, formats the received traffic data, codes the formatted traffic data, and interleaves and modulates (or symbol-maps) the coded traffic data to provide modulated symbols ("data symbols"). The symbol modulator 120 receives and processes the data symbols and pilot symbols to provide a symbol stream.

The symbol modulator 120 multiplexes the data symbols and pilot symbols and transmits the multiplexed data and pilot symbols to the transmitter 125. Here, each transmitted symbol may be a data symbol, a pilot symbol or a zero signal value. In each symbol period, pilot symbols may be consecutively transmitted. The pilot symbols may be FDM (Frequency Division Multiplex), OFDM (Orthogonal Frequency Division Multiplex), TDM (Time Division Multiplex) or CDM (Code Division Multiplex) symbols.

The transmitter 125 receives the symbol stream, converts the symbol stream into one or more analog signals and additionally controls (e.g. amplifies, filters and frequency-upconverts) the analog signals to generate a downlink signal suitable for transmission through a radio channel. Then, the transmit antenna 130 transmits the downlink signal to the MS.

In the configuration of the MS 110, the receive antenna 135 receives the downlink signal from the BS and provides the received downlink signal to the receiver 140. The receiver 140 adjusts (e.g. filters, amplifies and frequency-downconverts) the received signal and digitizes the adjusted signal to acquire samples. The symbol demodulator 145 demodulates received pilot symbols and provides the demodulated pilot symbols to the processor 155 for channel estimation.

In addition, the symbol demodulator 145 receives a frequency response estimate for downlink from the processor 155, demodulates received data symbols to acquire data symbol estimates (estimates of the transmitted data symbols) and provides the data symbol estimates to the Rx data processor 150. The Rx data processor 150 demodulates (i.e., symbol-demaps), deinterleaves and decodes the data symbol estimates to restore the transmitted traffic data.

Processing according to the symbol demodulator 145 and the data processor 150 and processing according to the symbol modulator 120 and the Tx data processor 115 of the BS 105 are complementary.

On uplink, the Tx data processor 165 of the MS 110 processes traffic data to provide data symbols. The symbol modulator 170 receives the data symbols, multiplexes the data symbols, modulates the multiplexed data symbols and provides a symbol stream to the transmitter 175. The transmitter 175 receives the symbol stream and processes the received symbol stream to generate an uplink signal. The transmit antenna 135 transmits the uplink signal to the BS 105.

In the BS 105, the uplink signal is received through the receive antenna 130 from the MS 110 and the receiver 190 processes the received uplink signal to acquire samples. The symbol demodulator 195 processes the samples to provide pilot symbols received for the uplink and data symbol estimates. The Rx data processor 197 processes the data symbol estimates to restore the traffic data transmitted from the MS 110.

The processors 155 and 180 of the MS 110 and the BS 105 direct (e.g. control, adjust, manage, etc.) operations of the MS 110 and the BS 105. The processors 155 and 180 can be respectively connected to the memories 160 and 185 that store program codes and data. The memories 160 and 185 are respectively connected to the processors 155 and 180 and store operating systems, applications and general files.

The processors 155 and 180 can be called controllers, microcontrollers, microprocessors, microcomputers, etc. The processors 155 and 180 may be implemented by hardware, firmware, software, or combinations thereof. When the embodiments of the present invention are implemented using hardware, ASICs (Application Specific Integrated Circuits), DSPs (Digital Signal Processors), DSPDs (Digital Signal Processing Devices), PLDs (Programmable Logic Devices) or FPGAs (Field Programmable Gate Arrays) configured to implement the present invention may be included in the processors 155 and 180.

In a firmware or software configuration, the embodiments of the present invention may be implemented in the form of a module, a procedure, a function, etc. Firmware or software configured to implement the present invention may be included in the processors 155 and 180 or stored in the memories 160 and 185 and executed by the processors 155 and 180.

Layers of a wireless interface protocol between the MS and the BS and a wireless communication system (network) can be classified into a first layer (L1), a second layer (L2) and a third layer (L3) on the basis of lower three layers of the OSI (Open System Interconnection) model well-known in communication systems. A physical layer belongs to the first layer and provides an information transmission service through a physical channel. An RRC (Radio Resource Control) layer corresponds to the third layer and provides control radio resources between the MS and the network. The MS and the BS can exchange RRC messages through a wireless communication network and the RRC layer.

The above-mentioned S-SFH is mapped to an S-SFH information element (S-SFH IE). The S-SFH can be classified into 3 S-SFH sub-packet IEs, S-SFH SP1 IE, S-SFH SP2 IE and S-SFH SP3 IE. The S-SFH SP1 IE includes a 2-bit power control channel size indicator. The power control channel size indicator indicates the resource size of a power control A-MAP (referred to as PC A-MAP hereinafter).

Figure 2:
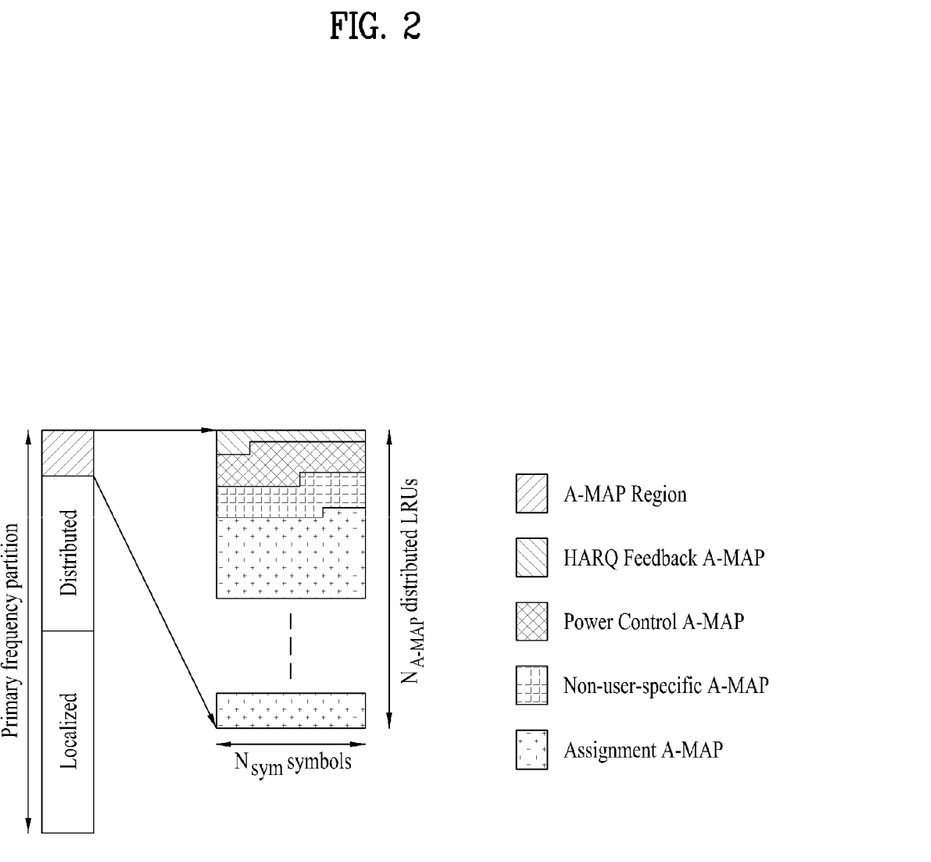
FIG. 2 shows an exemplary A-MAP region in the IEEE 802.16m system.

FIG. 2 shows an exemplary A-MAP region in the IEEE 802.16m system.

Referring to FIG. 2, an A-MAP corresponding to control information in the IEEE 802.16m system is classified into a non-user-specific A-MAP and a user-specific A-MAP, as described above. The user-specific A-MAP includes an assignment A-MAP, a HARQ feedback A-MAP and a PC A-MAP. The A-MAP is located in a specific time region and a specific frequency region, as shown in FIG. 2. The HARQ feedback A-MAP, PC A-MAP, non-user-specific A-MAP and assignment A-MAP may be sequentially allocated to the A-MAP region. The MS can conveniently decode the A-MAP when the MS knows the A-MAP resource allocation rule. For example, if the MS is informed of the channel size and order of each A-MAP, the MS implicitly recognizes the start point and end point of each A-MAP. Accordingly, if the corresponding A-MAP is not destined for the MS, the MS can skip decoding of the A-MAP and attempt to decode another A-MAP.

The resource size of the HARQ feedback A-MAP can be fixed according to system bandwidth. The resource size of the PC A-MAP can be fixed according to bandwidth, FBCH, and HARQ feedback channel (HFBCH). The resource size of the non-user-specific A-MAP is fixed according to system bandwidth. While the assignment A-MAP is variable within a system bandwidth, the end point of the assignment A-MAP can be detected using the non-user-specific A-MAP.

Since the HARQ feedback A-MAP starts from logical index 0 according to a predefined rule in the system and the size thereof is fixed, the MS can be aware of the end point of the HARQ feedback A-MAP. The end point of the HARQ feedback A-MAP corresponds to the start point of the PC A-MAP. In addition, the MS can detect the resource size of the PC A-MAP (or PC A-MAP IE) through a power control channel resource size indicator. Since the end point of the PC A-MAP corresponds to the start point of the non-user-specific A-MAP and the resource size of the non-user-specific A-MAP is fixed, the MS can implicitly recognize the start point of the following assignment A-MAP. In addition, the MS can be implicitly aware of the end point of the assignment A-MAP through the non-user-specific A-MAP immediately preceding the assignment A-MAP.

Figure 3:
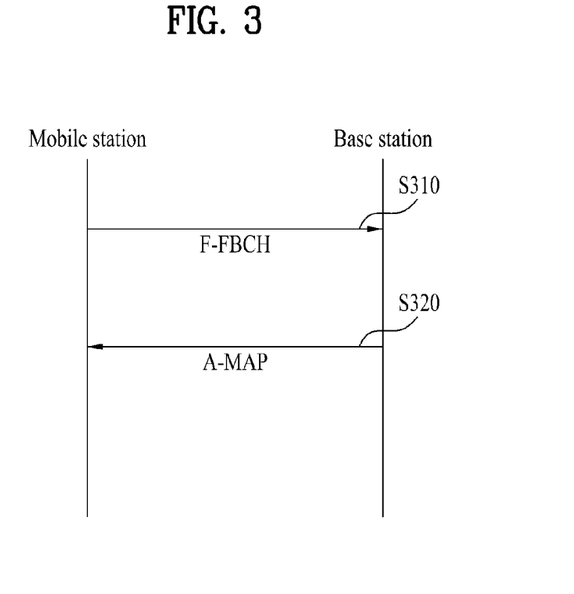
FIG. 3 illustrates an exemplary signal flow between an MS and a BS.

FIG. 3 illustrates an exemplary signal flow between an MS and a BS.

Referring to FIG. 3, the MS can transmit feedback information to the BS through an FFBCH (Fast Feedback Channel) corresponding to an uplink control channel (S310). The BS needs to transmit a PC A-MAP (or PC A-MAP IE) to MSs which have transmitted FFBCHs. Accordingly, the BS can determine a power correction value on the basis of a received SINR (Signal to Interference plus Noise Ratio) of an MS that has transmitted an FFBCH, carry the power correction value on a PC A-MAP and transmit the power correction value to the MS through an A-MAP (S320). The PC A-MAP is synchronized with transmission of the FFBCH corresponding to an uplink control channel, and thus the MS may be implicitly aware of the channel index of the received PC A-MAP on the basis of the FFBCH index. The number of MSs that have transmitted FFBCHs may be less than or equal to the number of MSs that receive the PC A-MAP. The PC A-MAP is composed of PC A-MAP IEs using two or four tones/subcarriers.

The above-mentioned three S-SFH sub-packet IEs (that is, S-SFH SP1 IE, S-SFH SP2 IE and S-SFH SP3 IE) can be transmitted at different timings in different periods. The S-SFH SP3 IE has the longest period and the S-SFH SP1 IE has the shortest period. That is, an SFH configuration method is determined according to importance and update period of information. The MS can perform smooth communication with the BS by receiving all information including SFHs broadcast by the BS.

The PC A-MAP resource size indicator was not defined in conventional systems. However, it is necessary to define the PC A-MAP resource size indicator for implicit detection of the position of non-user-specific A-MAP information by the MS. In the following description, a method for determining a power control channel resource size indicator in the S-SFH SP1 IE is proposed.

Table 1 shows information on a PC A-MAP resource size indicator.

TABLE 1

| Syntax | Size (bit) | Notes |
| --- | --- | --- |
| Power control channel resource size indicator | 2 | The total number of PC A-MAP IEs, $N_{PC-A-MAP}$, is as follows.<br>0b00: 0 (no use of PC A-MAP IE)<br>0b01: 14 if UFPC is 0<br>0b10: 28 if UFPC is 0<br>0b11: 44 if UFPC is 0 |

The size of a PC A-MAP is affected by the number of distributed logical resource units (DLRUs) and a HARQ feedback channel size. Accordingly, if determination of the size of the PC A-MAP is limited to a specific case without sufficiently considering various cases, system resources may be wasted.

A feedback channel (FBCH) is composed of a HARQ feedback channel and a fast feedback channel (FFBCH). The size of the FBCH (referred to as UL_FEEDBACK_SIZE) is defined by DLRUs in a specific frequency partition FPi, and the number of feedback channels of FPi, $L_{FB,FPi}$, can be defined by Equation 1.

$$L_{FB,FPi} = N_{fb} \times UL\_FEEDBACK\_SIZE \qquad [\text{Equation 1}]$$

Here, UL_FEEDBACK_SIZE is defined as the number of DLRUs for uplink feedback channels for each uplink AAI subframe in the specific frequency partition FPi, and $N_{fb}$ is 3, in general, and may be defined as 4 in a subframe that supports uplink PUSC (Partially Used Subcarrier) permutation and supports the legacy system according to FDM. The legacy system refers to a system of a previous version of the present wireless communication system. For example, IEEE 802.16e system may be the legacy system of IEEE 802.16m system. A specific index can be designated and used as a frequency partition (FP) index. For example, a control channel need not be restricted by transmit power because of characteristics thereof, and thus it can be assumed that the control channel is transmitted only in an FP which is designed in consideration of the characteristics of the control channel. UL_FEEDBACK_SIZE can be signaled in 4 bits to the MS by the BS in the S-SFH SP3 IE.

As described above, the number of feedback channels of the FPi, $L_{FB,FPi}$, is largely affected by the frequency partitioning rule and whether the legacy mode is supported. The number of FFBCHs can be obtained using a method represented by Equation 2.

$$L_{FFB,FPi} = L_{FB,FPi} - k \times L_{HFB}/6 \qquad [\text{Equation 2}]$$

Here, $L_{FFB,FPi}$ denotes the number of FFBCHs of the frequency partition i (FPi) and $L_{HFB}$ represents a value signaled by the BS in the S-SFH SP1 IE according to system bandwidth through the following method. $L_{HFB}$ denotes the number of uplink HARQ channels for each HARQ region defined in the S-SFH SP1 IE, has a size of 2 bits and indicates one of 6, 12, 18 and 24 in the case of a 5 MHz bandwidth, one of 6, 12, 24 and 30 in the case of a 10 MHz bandwidth, and one of 12, 24, 48 and 60 in the case of a 20 MHz bandwidth. In addition, k is a value determined according to downlink/uplink ratio in a frame and represents a minimum value of HARQ regions in an uplink subframe. For example, when the ratio of the number of uplink subframes to the number of downlink subframes is 6:2, 5:3 and 4:4, k may be 3, 2 and 1, respectively. If the ratio of the number of uplink subframes to the number of downlink subframes is 3:5 and 2:6, k may be 0.

As described above, $L_{FFB,FPi}$ is affected by the system bandwidth and the method of configuring $L_{HFB}$ within the system bandwidth. The number ($L_{FFB,FPi}$) of FFBCHs of the frequency partition i (FPi) can be determined by the system bandwidth (5/10/20 MHz), the method of configuring $L_{HFB}$ within the system bandwidth, frequency portioning rule, whether the legacy mode is supported, k, etc.

As described above, the BS needs to calculate $L_{FFB,FPi}$ in consideration of many parameters and signal the $L_{FFB,FPi}$ to the MS because the number of channels of the PC A-MAP is defined by the number of FFBCHs of the frequency partition i (FPi), $L_{FFB,FPi}$. However, when a maximum value is reserved for $L_{FFB,FPi}$ for the system bandwidth, a large amount of resources is wasted.

Accordingly, the MS can obtain the number of FFBCHs using $L_{HFB}$ of Equation 2, received through the S-SFH SP1 IE from the BS, and UL_FEEDBACK_SIZE of Equation 1, received through the S-SFH SP3 IE. The number of FFBCHs can correspond to the PC A-MAP resource size. That is, the resource size of the power control channel can be defined as $L_{FFB,FPi}$.

Therefore, the BS need not broadcast $L_{FFB,FPi}$ to the MS. Furthermore, it is possible to prevent resource waste, which may be generated when a maximum value is reserved for $L_{FFB,FPi}$, and to reduce control overhead since $L_{FFB,FPi}$ is determined considering the number of cases. $L_{FFB,FPi}$ may vary according to uplink subframe due to factor k, and thus the PC A-MAP resource size also vary per in units of downlink subframe because the PC A-MAP resource size reflects $L_{FFB,FPi}$.

$L_{FFB,FPi}$ and the PC A-MAP resource size vary according to the ratio of the number of uplink subframes to the number of downlink subframes. For example, the PC A-MAP resource size can be represented by Equation 3.

Resource size of PC A-MAP IE=Ceil(the number of uplink subframes×the number of FFBCHs/the number of downlink subframes) [Equation 3]

Here, the number of downlink/uplink subframes means the number of downlink/uplink subframes in one frame, and Ceil (k) function rounds up to the nearest integer. For example, Ceil(2.1)=3 and Ceil(4)=4. When downlink subframes capable of transmitting the PC A-MAP are defined, the resource size of the PC A-MAP can be obtained according to the downlink subframes. When the ratio of the number of downlink subframes to the number of uplink subframes is 3:5, only two of three downlink subframes may be used. Provided that the system bandwidth is 20 MHz, the number of DLRUs is 15, the number of H-FBCHs is 12, k=1, $N_{fb}$=3 and the ratio of the number of downlink subframes to the number of uplink subframes is 3:5, the size of the PC A-MAP to be transmitted in a downlink subframe is calculated by the processor 155 of the MS as follows. $L_{FB,FPi}$=3×15=45 according to Equation 1 and $L_{FFB,FPi}$=45−1×12/6=43 according to Equation 2. The PC A-MAP resource size=Ceil(5×43/3)=72 according to Equation 3. Accordingly, the resource size of the PC A-MAP that will be transmitted from the BS in a subframe is 72. This calculation process can be performed by the processor 155 of the MS. When $N_{fb}$=4, the PC A-MAP resource size becomes 97.

Alternatively, when the system bandwidth is 5 MHz, the number of DLRUs is 15, the number of H-FBCHs is 6, k=1, $N_{fb}$(Mzone)=3, the ratio of the number of downlink subframes to the number of uplink subframes is 3:5, and the size of the PC A-MAP to be transmitted in a downlink subframe is calculated by the processor 155 of the MS as above, the PC A-MAP resource size becomes 74. If $N_{fb}$=4, the PC A-MAP resource size becomes 79.

Alternatively, when the system bandwidth is 8.85 MHz, the number of DLRUs is 15, the number of H-FBCHs is 6, k=1, $N_{fb}$=3, the ratio of the number of downlink subframes to the number of uplink subframes is 2:4, and the size of the PC A-MAP that to be transmitted in a downlink subframe is calculated by the processor 155 of the MS as above, the PC A-MAP resource size becomes 88. If $N_{fb}$=4, the PC A-MAP resource size becomes 118.

While the processor 155 of the MS calculates the PC A-MAP resource size in the present embodiment, the BS may calculate the PC A-MAP resource size and signal the calculated PC A-MAP resource size to the MS. The BS can implicitly or explicitly signal the PC A-MAP resource size to the MS for each subframe in which the PC A-MAP is transmitted. Otherwise, the BS can signal, to the MS, only a largest value from among resource sizes of PC A-MAPs to be transmitted in downlink subframes.

Because the PC A-MAP resource size is calculated after the MS receives the S-SFH SP1 IE and S-SFH SP3 IE, the PC A-MAP resource size cannot be calculated if any one of the S-SFH SP1 IE and S-SFH SP3 IE is not received. Accordingly, UL_FEEDBACK_SIZE information (e.g. 4 bits) is preferably moved to the S-SFH SP1 from the S-SFH SP3 IE and defined.

Alternatively, the PC A-MAP resource size can be calculated by multiplying the number of uplink subframes by the number of FFBCHs and signaled by the BS to the MS. In this case, a downlink subframe PC A-MAP can signal power correction values of all MSs that have transmitted FFBCHs in a previous frame. This is a method that performs transmission only in a predetermined downlink subframe. This method can be performed in such a manner that an available downlink subframe is set to 1.

Tables 2 and 3 show information on the PC A-MAP resource size indicator included in the S-SFH SP1 IE.

TABLE 2

| Syntax | Size (bit) | Notes |
|---|---|---|
| Power control channel resource size indicator | 2 | A total of the number of PC A-MAP IEs, $N_{PC-A-MAP}$, is as follows.<br>0b00: 0 (no use of PC A-MAP IE)<br>0b01: 2 × Ceil(10 × D/U)<br>0b10: 2 × Ceil(19 × D/U)<br>0b11: 2 × Ceil(32 × D/U)<br>Here, U and D denote the number of uplink subframes and the number of downlink subframes available in one frame, respectively. |

TABLE 3

| Syntax | Size (bit) | Notes |
|---|---|---|
| Power control channel resource size indicator | 2 | A total of the number of PC A-MAP IEs, $N_{PC-A-MAP}$, is as follows.<br>0b00: 0 (no use of PC A-MAP IE)<br>0b01: Ceil(19 × D/U)<br>0b10: Ceil(38 × D/U)<br>0b11: Ceil(63 × D/U)<br>Here, U and D denote the number of uplink subframes and the number of downlink subframes available in one frame, respectively. |

Referring to Tables 2 and 3, the processor 180 of the BS can calculate the resource size of a PC A-MAP IE and signal the resource size to the MS through a power control channel resource size indicator field of the S-SFH SP1 IE. In this case, the processor 180 of the BS can determine the resource size of the PC A-MAP IE using the number of uplink subframes and the number of downlink subframes, which are available in one frame, (or the ratio of the number of uplink subframes to the number of downlink subframes), the number of FFBCHs, and the Ceil function. Particularly, the resource size of the PC A-MAP IE needs to be an even number all the time, as shown in Table 3, because an even number of PC A-MAP IE chains is mapped to a PC A-MAP symbol when the BS transmits PC A-MAP symbols.

Figure 4:
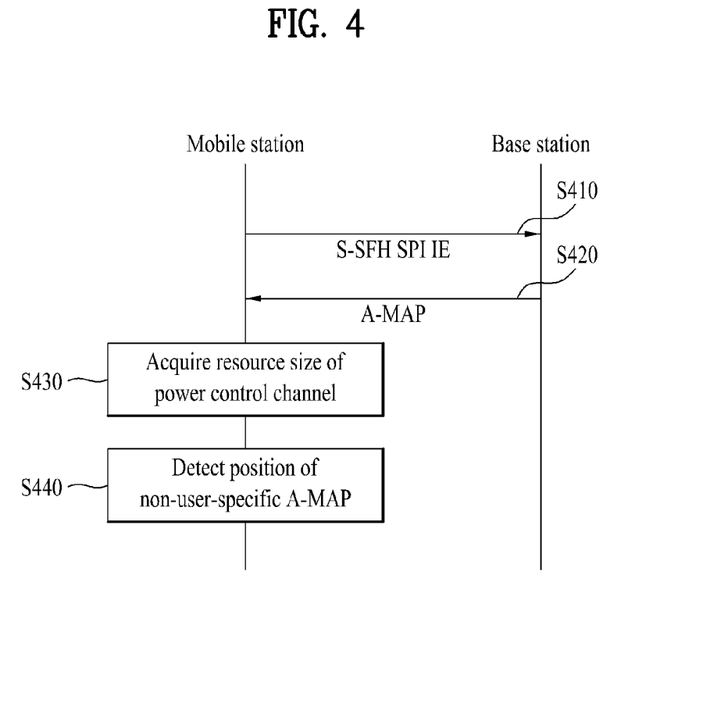
FIG. 4 illustrates an exemplary process through which the MS detects the start point of a non-user-specific A-MAP by acquiring a PC A-MAP.

FIG. 4 illustrates an exemplary process through which the MS detects the start point of a non-user-specific A-MAP by acquiring a PC A-MAP.

Referring to FIG. 4, the MS may receive the S-SFH SP1 IE from the BS in a predetermined period (S410). The MS may receive an A-MAP from the BS for each downlink subframe (S420). The processor 155 of the MS may decode a power control channel resource size indicator field included in the S-SFH SP1 IE received from the BS (S430). The processor 155 of the MS may be aware of the resource size of the PC A-MAP IE (or PC A-MAP) by decoding the power control channel resource size indicator field (S430). The processor 155 of the MS knows the resource size of the PC A-MAP IE since A-MAP information included in the A-MAP is mapped to resources in a predetermined order, and the processor 155 of the MS can detect position (i.e. start point) of the non-user-specific A-MAP because the non-user-specific A-MAP is allocated adjacent to the PC A-MAP (S440). Then, the MS may receive control information that is included in the non-user-specific A-MAP and broadcast.

Figure 5:
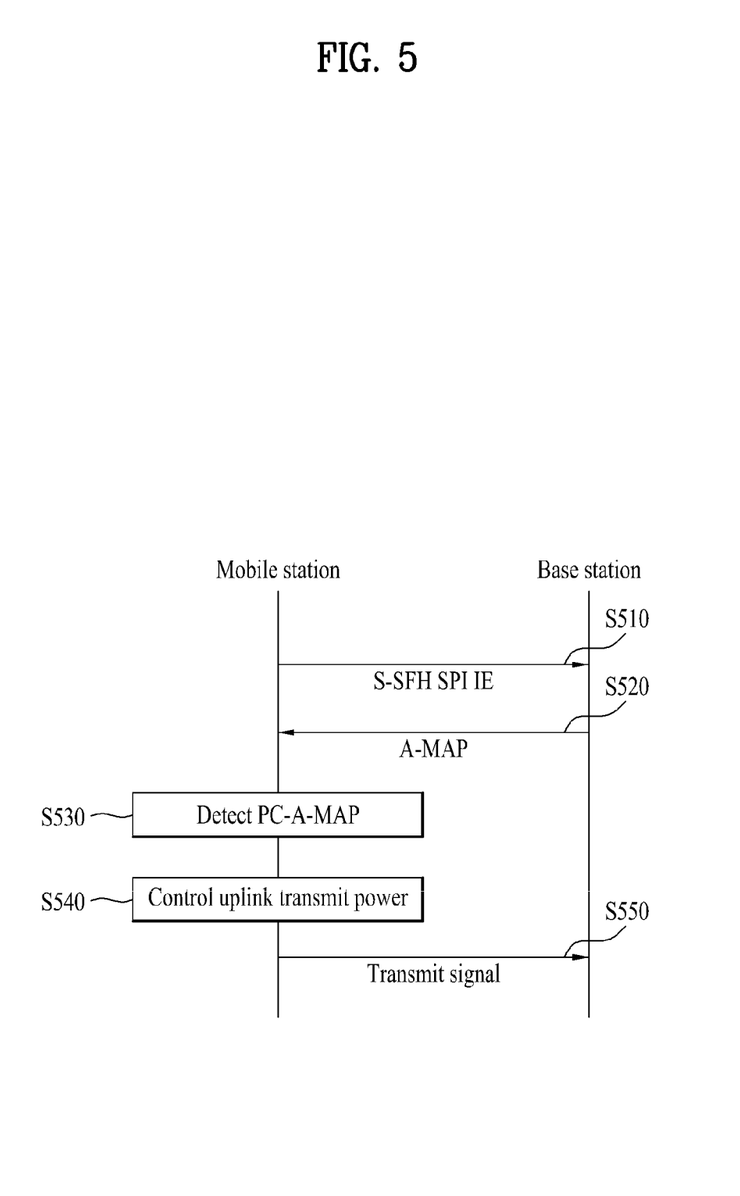
FIG. 5 illustrates an exemplary process through which the MS performs uplink power control by acquiring the PC A-MAP.

FIG. 5 illustrates an exemplary process through which the MS performs uplink power control by acquiring the PC A-MAP.

Referring to FIG. 5, the MS may receive the S-SFH SP1 IE from the BS in a predetermined period (S510). The processor 155 of the MS may be aware of a power control channel resource size by decoding the power control channel resource size indicator field included in the S-SFH SP1 IE received from the BS. The MS may receive an A-MAP from the BS for each downlink subframe (S520). The MS may detect a PC A-MAP IE included in the A-MAP through power control channel resource size information obtained from the power control channel resource size indicator field (S530). The PC A-MAP IE can include information as shown in Table 4.

TABLE 4

| Syntax | Size (bit) | Notes |
|---|---|---|
| PC-A-MAP IE format { | | |
| Power correction value | 2 | 0b00 = −0.5 dB |
| | | 0b01 = 0.0 dB |
| | | 0b10 = 0.5 dB |
| | | 0b11 = 1.0 dB |
| } | | |

The PC A-MAP IE includes a 2-bit power correction value. The power correction value can be used for uplink power control (particularly, uplink control channel power control) of the processor 155 of the MS. A description will be given of Equation 4 used for uplink power control of the MS in an IEEE 802.16m mobile communication system. In general, the MS needs to determine an uplink transmit power value when transmitting an uplink signal. The 2-bit power correction value included in the PC A-MAP IE may correspond to an offset (particularly, an offset for a control channel) in Equation 4.

$$P(dBm) = L + SINR_{Target} + NI + Offset \quad \text{[Equation 4]}$$

Here, P denotes a transmit power level (dBm) per subcarrier and stream for current transmission and L represents a current average downlink propagation loss estimated by the MS. L includes a Tx antenna gain and path loss of the MS. $SINR_{Target}$ is a target uplink SINR (Signal to Interference plus Nose Ratio) received by the MS from the BS. NI is average noise and interference level (dBm) per subcarrier, estimated by the BS, and is received by the MS from the BS. Offset is a correction term for power offset per MS. An offset value is transmitted from the BS through a power control message. There are two offset values Offsetdata, used for data transmission, and Offsetcontrol, used for control information transmission.

In the case of a control channel on which control information is transmitted, the MS can apply a target SINR corresponding to the control channel to Equation 4 using Table 5.

TABLE 5

| Control channel type | $SINR_{Target}$ parameters |
|---|---|
| HARQ Feedback | targetHarqSinr |
| Synchronized Ranging | targetSyncRangingSinr |
| P-FBCH | targetPfbchSinr |
| S-FBCH | targetSfbchBaseSinr |
| | targetSfbchDeltaSinr |
| Bandwidth Request | targetBwRequestSinr |

However, when the MS transmits data, the target SINR needs to be set using Equation 5.

$$SINR_{Target} = \quad \text{[Equation 5]}$$
$$10\log10\left(\max\left(10 \wedge \left(\frac{SINR_{MIN}(dB)}{10}\right), \gamma_{IoT} \times SIR_{DL} - \alpha\right)\right) -$$
$$\beta \times 10\log10(TNS)$$

Here, $SINR_{MIN}(dB)$ is a minimum SINR necessary for the BS and is set through a unicast power control message. $SINR_{MIN}$ is represented by 4 bits and can have one of values {−∞, −3, −2.5, −1, 0, 0.5, 1, 1.5, 2, 2.5, 3, 3.5, 4, 4.5}. $SIR_{DL}$ denotes a downlink signal to interference power ratio measured by the MS.

In addition, γIoT is a fairness and IoT control factor and is broadcast by the BS to the MS. Alpha(α) is a factor according to the number of Rx antennas in the BS and is signaled as 3 bits through MAC power control mode signaling. In this case, Alpha(α) can be represented as {1, ½, ¼, ⅛, 1/16, 0}, for example. Beta(β) can be set to 0 or 1 through MAC power control mode signaling.

TNS denotes the number of streams in an LRU (Logical Resource Unit) indicated by a UL-A-MAP IE. In the case of SU-MIMO, TNS is set to Mt which denotes the number of streams per user. CSM is set to TNS and denotes the total number of streams. In the case of control channel transmission, CSM can be set to 1.

As described above, the processor 155 of the MS can determine uplink transmit power using the power correction value included in the detected PC A-MAP IE, L, NI, $SINR_{Target}$ (S540). Then, the MS can transmit an uplink signal to the BS with the determined uplink transmit power (S550).

A description will be given of an S-SFH SP1 IE format when the IEEE 802.16m system supports the legacy mode, that is, when the IEEE 802.16m system supports IEEE 802.16e MSs. When the legacy mode is supported, the number of FBCHs can be represented by Equation 6.

$$L_{FB,FPi} = N_{fb} \times UL\_FEEDBACK\_SIZE \quad \text{[Equation 6]}$$

Here, $N_{fb}$ is 4 and UL_FEEDBACK_SIZE ranges from 1 LRU to 16 LRUs.

Table 6 shows the number of FBCHs and the number of H-FBCHs in the case of a system bandwidth of 5/10/20 MHz when the legacy mode is supported.

TABLE 6

| | Number of LRUs | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| | Number of FBCHs | | | | | | | | | | | | | | | |
| | 4 | 8 | 12 | 16 | 20 | 24 | 28 | 32 | 36 | 40 | 44 | 48 | 52 | 56 | 60 | 64 |
| Number of channels for FFBCH | | | | | | | | | | | | | | | | |
| H-FBCH at 5 MHz | | | | | | | | | | | | | | | | |
| 0b00 | 3 | 7 | 11 | 15 | 19 | 23 | 27 | 31 | 35 | 39 | 43 | 47 | 51 | 55 | 59 | 63 |
| 0b01 | | 6 | 10 | 14 | 18 | 22 | 26 | 30 | 34 | 38 | 42 | 46 | 50 | 54 | 58 | 62 |
| 0b10 | | 5 | 9 | 13 | 17 | 21 | 25 | 29 | 33 | 37 | 41 | 45 | 49 | 53 | 57 | 61 |
| 0b11 | | | 8 | 12 | 16 | 20 | 24 | 28 | 32 | 36 | 40 | 44 | 48 | 52 | 56 | 60 |
| H-FBCH at 10 MHz | | | | | | | | | | | | | | | | |
| 0b00 | 3 | 7 | 11 | 15 | 19 | 23 | 27 | 31 | 35 | 39 | 43 | 47 | 51 | 55 | 59 | 63 |
| 0b01 | | 6 | 10 | 14 | 18 | 22 | 26 | 30 | 34 | 38 | 42 | 46 | 50 | 54 | 58 | 62 |
| 0b10 | | | 8 | 12 | 16 | 20 | 24 | 28 | 32 | 36 | 40 | 44 | 48 | 52 | 56 | 60 |
| 0b11 | | | 11 | 15 | 19 | 23 | 27 | 31 | 35 | 39 | 43 | 47 | 51 | 55 | 59 | |
| H-FBCH at 20 MHz | | | | | | | | | | | | | | | | |
| 0b00 | | 6 | 10 | 14 | 18 | 22 | 26 | 30 | 34 | 38 | 42 | 46 | 50 | 54 | 58 | 62 |
| 0b01 | | | 8 | 12 | 16 | 20 | 24 | 28 | 32 | 36 | 40 | 44 | 48 | 52 | 56 | 60 |
| 0b10 | | | | | 16 | 20 | 24 | 28 | 32 | 36 | 40 | 44 | 48 | 52 | 56 | |
| 0b11 | | | | | | 18 | 22 | 26 | 30 | 34 | 38 | 42 | 46 | 50 | 54 | |

In Table 6, the number or LRUs may represent the number of LRUs of an FBCH. When legacy support is performed according to uplink FDM at each system bandwidth, about 50% of each resource cannot be used. Although a maximum value of the number of FFBCHs is 31 when the number of LRUs is 8, the number of FFBCHs needs to be a multiple of 2 because PC A-MAP information is configured using the SFBC transmission method (tone pair permutation on downlink). Accordingly, the maximum value of the number of FFBCHs needs to be fixed to 32. This can be represented as 2×ceil(16×D/U). However, when the above-described constraint is not present, a legacy support mode (FDM type) can be defined as one of Tables 8, 9 and 10.

TABLE 7

| Syntax | Size (bits) | Notes |
|---|---|---|
| Power control channel resource size indicator | 2 | The total number of PC-A-MAP IEs, $N_{PC-A-MAP}$, is as follows.<br>0b00: 0 (no use of PC A-MAP IE)<br>0b01: 2 × Ceil(10 × D/U)<br>0b10: 2 × ceil(19 × D/U)<br>0b11: 2 × ceil(32 × D/U)<br>Here, U and D denote the number of uplink subframes and the number of downlink subframes available in one frame, respectively. |

TABLE 8

| Syntax | Size (bits) | Notes |
|---|---|---|
| Power control channel resource size indicator | 2 | The total number of PC-A-MAP IEs, $N_{PC-A-MAP}$, is as follows.<br>0b00: 0 (no use of PC A-MAP IE)<br>0b01: Ceil(19 × D/U)<br>0b10: ceil(38 × D/U)<br>0b11: ceil(63 × D/U)<br>Here, U and D denote the number of uplink subframes and the number of downlink subframes available in one frame, respectively. |

TABLE 9

| Syntax | Size (bit) | Notes |
|---|---|---|
| Power control channel resource size indicator | 2 | The total number of PC-A-MAP IEs, $N_{PC-A-MAP}$, is as follows.<br>0b00: 0 (no use of PC A-MAP IE)<br>0b01: ceil(14 × U/D)<br>0b10: ceil(28 × U/D)<br>0b11: ceil(44 × U/D)<br>Here, U and D denote the number of uplink subframes and the number of downlink subframes available in one frame, respectively.<br>When the legacy support mode uses FDM on uplink, the total number of PC-A-MAP IEs, $N_{PC-A-MAP}$, is as follows.<br>0b00: 0 (no use of PC A-MAP IE)<br>0b01: Ceil(19 × D/U)<br>0b10: ceil(38 × D/U)<br>0b11: ceil(63 × D/U)<br>Here, U and D denote the number of uplink subframes and the number of downlink subframes available in one frame, respectively. |

TABLE 10

| Syntax | Size (bits) | Notes |
| --- | --- | --- |
| Power control channel resource size indicator | 2 | The total number of PC-A-MAP IEs, $N_{PC\text{-}A\text{-}MAP}$, is as follows.<br>0b00: 0 (no use of PC A-MAP IE)<br>0b01: ceil(14 × U/D)<br>0b10: ceil(28 × U/D)<br>0b11: ceil(44 × U/D)<br>Here, U and D denote the number of uplink subframes and the number of downlink subframes available in one frame, respectively.<br>When the legacy support mode uses FDM on uplink, the total number of PC-A-MAP IEs, $N_{PC\text{-}A\text{-}MAP}$, is as follows.<br>0b00: 0 (no use of PC A-MAP IE)<br>0b01: 2 × ceil(10 × U/D)<br>0b10: 2 × ceil(19 × U/D)<br>0b11: 2 × ceil(32 × U/D)<br>Here, U and D denote the number of uplink subframes and the number of downlink subframes available in one frame, respectively. |

As shown in Tables 7 to 10, the PC A-MAP is configured of 2 bits, the BS informs the MS that 0b00 corresponds to 0 when the PC A-MAP is not used, and 0b01, 0b10 and 0b11 can be determined by dividing the number of LRUs of an FBCH at a predetermined ratio. Accordingly, the integers of the ceil functions in Tables 7 to 10 can be considered to be defined according to the following concept. For example, in a system using 16 LRUs, the upper limits of the integers are set to 5, 10 and 16. The LRU division method can be set differently, and thus the integers can be applied taking the number of FFBCHs of Table 6 into account. When the number of PC A-MAP IEs is represented in the form of 2×ceil( ), a final computation value needs to be an even integer greater than or equal to the number of FFBCHs necessary for each LRU.

The MS can be aware of the resource size of the PC A-MAP on the basis of basic information known to the BS and the MS rather than being informed by the BS. In a wireless communication system, it is possible to determine whether the PC A-MAP is used for uplink power control. When uplink power control (UL PC) is performed without using the PC A-MAP in the wireless communication system, the MS will unnecessarily attempt to decode the PC A-MAP whenever reading the A-MAP. Accordingly, setting an indicator that indicates whether the PC A-MAP is used aids in normal operations of the BS and MS. The indicator is 1 bit (i.e. 0: disable, 1: able) and is signaled by the BS to the MS. Otherwise, a predetermined PC A-MAP indicator can be used. For example, the BS can signal the indicator through an SFH, a message indicating system information or a message for allocating an uplink resource.

When the PC A-MAP is mainly used to set uplink power necessary for control channel transmission, the BS can signal the indicator only through a message for allocating a control channel. Alternatively, the BS can signal the indicator using a newly defined message type.

Various methods for obtaining the resource size of the PC A-MAP have been described. If the BS informs the MS of a PC A-MAP indicator (referred to as PI) (0 or 1) with respect to an obtained PC A-MAP or the MS knows the indicator according to a predetermined method irrespective of the method of obtaining the resource size of the PC A-MAP, it is possible to obtain the resource size of the PC A-MAP according to PI×(power control channel resource size).

A case in which the PC A-MAP is used all the time and a case in which the PC A-MAP is not used all the time can be discriminated from each other using the PC A-MAP indicator. The PC A-MAP indicator can be set periodically, non-periodically or in an event triggering manner. Furthermore, it is possible to use the PC A-MAP indicator only in a specific period of time by setting a timer. Use of the PC A-MAP through a power control channel is not be always necessary for uplink power control when the PC A-MAP indicator is set. This aids in obtaining the PC A-MAP resource size and information on a different A-MAP.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

Although embodiments have been described with reference to a number of illustrative embodiments, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

The above-described device and method for transmitting and receiving control information in a wireless communication system supporting a plurality of wireless communication methods can be applied to various mobile communication systems such as 3GPP LTE, LTE-A, IEEE 802, etc.

The invention claimed is:

1. A method for determining a number ($N_{FFB}$) of fast feedback channel (FFBCH) by an apparatus in a wireless communication system supporting a first wireless communication scheme and a second wireless communication scheme, the method comprising:
   receiving an indicator, the indicator indicating whether or not to use a power control A-MAP (PC A-MAP) when controlling an uplink power;
   when the indicator indicates the PC A-MAP should be used for controlling the uplink power:
      receiving a secondary-superframe header sub-packet1 information element (S-SFH SP1 IE), the S-SFH SP1 IE including a number ($N_{HFB}$) of uplink hybrid automatic repeat request (HARQ) feedback channels per HARQ feedback region;
      receiving a secondary-superframe header sub-packet3 information element (S-SFH SP3 IE), the S-SFH SP3 IE including a number ($N_{FB}$) of distributed logical resource units (LRUs) in an uplink subframe reserved for uplink feedback channels;

determining the number of FFBCH ($N_{FFB}$) in the uplink subframe based on the received $N_{HFB}$ and $N_{FB}$;

obtaining a resource size of the PC A-MAP based on the number ($N_{FFB}$) of FFBCH, wherein the obtained resource size of the PC A-MAP is represented as only an even number such as 2×ceil(10×D/U), 2×ceil(19×D/U), or 2×ceil(32×D/U), and wherein the ceil represents a ceil function, U is a number of uplink subframes per frame, and D is a number of downlink subframes per frame; and detecting a start point of non-user-specific control information based on the obtained power control channel resource size of the PC A-MAP; and when the indicator indicates the PC A-MAP should not be used, controlling the uplink power without decoding the PC A-MAP.

2. The method according to claim 1, wherein the number of FFBCH ($N_{FFB}$) is calculated by using Equation A:

$$N_{FFB} = N_{fb} \times N_{FB} - k \times N_{HFB}/6 \qquad \text{Equation A}$$

wherein $N_{fb}$=3 or 4, and k is a value related to a ratio of a number of downlink subframes to a number of uplink subframes in a frame, where k=1 or 3, wherein the $N_{HFB}$ is one of 6, 12, 18 or 24 for 5 MHz band, the $N_{HFB}$ is one of 6, 12, 24 or 30 for 10 MHz band, and the $N_{HFB}$ is one of 12, 24, 48 or 60 for 20 MHz band, and wherein k is 3 when the ratio of the number of downlink subframes to the number of uplink subframes is 6:2.

3. The method according to claim 1, wherein the number of FFBCH ($N_{FFB}$) is calculated by using Equation A:

$$N_{FFB} = N_{fb} \times N_{FB} - k \times N_{HFB}/6 \qquad \text{Equation A}$$

wherein $N_{fb}$=3 or 4, and k is a value related to a ratio of a number of downlink subframes to a number of uplink subframes in a frame, where k=1 or 3, wherein the $N_{HFB}$ is one of 6, 12, 18 or 24 for 5 MHz band, the $N_{HFB}$ is one of 6, 12, 24 or 30 for 10 MHz band, and the $N_{HFB}$ is one of 12, 24, 48 or 60 for 20 MHz band, and wherein k is 1 when the ratio of the number of downlink subframes to the number of uplink subframes is 4:4.

4. The method according to claim 1, wherein regions for the first wireless communication scheme and the second communication scheme in the frame are configured by frequency division multiplexing (FDM) scheme.

5. An apparatus of determining a number ($N_{FFB}$) of fast feedback channel (FFBCH) station in a wireless communication system supportable a first wireless communication scheme and a second wireless communication scheme, the method comprising:

a receiver; and a processor operatively connected to the receiver and configured to receive an indicator, the indicator indicating whether or not to use a power control A-MAP (PC A-MAP) when controlling an uplink power;

when the indicator indicates the PC A-MAP should be used for controlling the uplink power:

receive a secondary-superframe header sub-packet1 information element (S-SFH SP1 IE), the S-SFH SP1 IE including a number ($N_{HFB}$) of uplink hybrid automatic repeat request (HARQ) feedback channels per HARQ feedback region, and receive a secondary-superframe header sub-packet3 information element (S-SFH SP3 IE), the S-SFH SP3 IE including a number ($N_{FB}$) of distributed logical resource units (LRUs) in an uplink subframe reserved for uplink feedback channels; and determine the number of FFBCH ($N_{FFB}$) in the uplink subframe based on the received $N_{HFB}$ and $N_{FB}$;

obtain a channel resource size of the PC A-MAP based on the number ($N_{FFB}$) of FFBCH, wherein the obtained resource size of the PC A-MAP is represented as only an even number such as 2×ceil(10×D/U), 2×ceil(19×D/U), or 2×ceil(32×D/U), and wherein the ceil represents a ceil function, U is a number of uplink subframes per frame, and D is a number of downlink subframes per frame, and detect a start point of non-user-specific control information based on the obtained power control channel resource size of the PC A-MAP; and when the indicator indicates the PC A-MAP should not be used, control the uplink power without decoding the PC A-MAP.

6. The apparatus according to claim 5, wherein the number of FFBCH ($N_{FFB}$) is calculated by using Equation A:

$$N_{FFB} = N_{fb} \times N_{FB} - k \times N_{HFB}/6 \qquad \text{Equation A}$$

wherein $N_{fb}$=3 or 4, and k is a value determined according to a ratio of a number of downlink subframes to a number of uplink subframes in a frame, where k=1 or 3, wherein the $N_{HFB}$ is one of 6, 12, 18 or 24 for 5 MHz band, the $N_{HFB}$ is one of 6, 12, 24 or 30 for 10 MHz band, and the $N_{HFB}$ is one of 12, 24, 48 or 60 for 20 MHz band, and wherein k is 3 when the ratio of the number of downlink subframes to the number of uplink subframes is 6:2.

7. The apparatus according to claim 5, wherein the number of FFBCH ($N_{FFB}$) is calculated by using Equation A:

$$N_{FFB} = N_{fb} \times N_{FB} - k \times N_{HFB}/6 \qquad \text{Equation A}$$

wherein $N_{fb}$=3 or 4, and k is a value determined according to a ratio of a number of downlink subframes to a number of uplink subframes in a frame, where k=1 or 3, wherein the $N_{HFB}$ is one of 6, 12, 18 or 24 for 5 MHz band, the $N_{HFB}$ is one of 6, 12, 24 or 30 for 10 MHz band, and the $N_{HFB}$ is one of 12, 24, 48 or 60 for 20 MHz band, and wherein k is 1 when the ratio of the number of downlink subframes to the number of uplink subframes is 4:4.

* * * * *